US00RE45590E

(19) United States
(12) Reissued Patent
Hinzpeter et al.

(10) Patent Number: US RE45,590 E
(45) Date of Reissued Patent: Jun. 30, 2015

(54) RING SEGMENT FOR A TABLET PRESS

(75) Inventors: Jügen Hinzpeter, Schwarzenbek (DE); Ulrich Zeuschner, Delmenhorst (DE); Peter Lüneberg, Berkenthin (DE); Ulrich Arndt, Lauenberg/Elbe (DE); Angelika Arndt, legal representative, Sonnental (DE); Hans Wolf, Schwarzenbek (DE); Matthias Rau, Dassendorf (DE)

(73) Assignee: Fette Compacting GmbH, Schwarzenbek (DE)

(21) Appl. No.: 13/028,591

(22) Filed: Feb. 16, 2011

Related U.S. Patent Documents

Reissue of:
(64) Patent No.: 7,491,052
Issued: Feb. 17, 2009
Appl. No.: 11/545,237
Filed: Oct. 10, 2006

U.S. Applications:
(63) Continuation of application No. 10/308,256, filed on Dec. 2, 2002, now Pat. No. 7,118,367.

(51) Int. Cl.
*B30B 15/02* (2006.01)
*B30B 11/08* (2006.01)
*B30B 15/30* (2006.01)

(52) U.S. Cl.
CPC ..... *B30B 15/30* (2013.01); *B30B 11/08* (2013.01)

(58) Field of Classification Search
USPC ..... 425/193, 195, 344–345, 353
See application file for complete search history.

(56) References Cited

U.S. PATENT DOCUMENTS

| | | | | | |
|---|---|---|---|---|---|
| 2,166,192 | A * | 7/1939 | Whittemore | 425/345 |
| 4,259,049 | A * | 3/1981 | Willich | 425/353 |
| 4,601,866 | A | 7/1986 | David | |
| 4,761,436 | A * | 8/1988 | Kohno et al. | 264/1.36 |
| 5,843,488 | A * | 12/1998 | Korsch et al. | 425/193 |
| 5,882,696 | A * | 3/1999 | Fabbri | 425/345 |
| 6,471,501 | B1 * | 10/2002 | Shinma et al. | 425/195 |

FOREIGN PATENT DOCUMENTS

| | | |
|---|---|---|
| DE | 225851 A3 | 7/1985 |
| EP | 0 963 836 A1 | 10/1998 |
| EP | 0963836 | 12/1999 |
| GB | 915612 | 1/1963 |
| JP | 10305395 | 11/1998 |

* cited by examiner

*Primary Examiner* — Joseph S. Del Sole
*Assistant Examiner* — Thukhanh Nguyen
(74) *Attorney, Agent, or Firm* — Vidas, Arrett & Steinkraus

(57) ABSTRACT

A rotor for a tablet press including an upper-ram receptacle for the upper rams and a lower-ram guide for the lower rams of the tablet press, as well as a retainer plate having a series of die-bores which are oriented towards the upper and lower rams wherein the retainer plate is composed of at least two ring segments which are adapted to be mounted non-positively and/or positively to the body of the lower-ram guide by means of a fixing device.

59 Claims, 2 Drawing Sheets

RING SEGMENT FOR A TABLET PRESS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

*This application is a reissue of U.S. Pat. No. 7,491,052, which issued Feb. 17, 2009, the entire contents of which are hereby incorporated by reference.* This application is a Continuation application from Ser. No. 10/308256, filed Dec. 2, 2002, issued as U.S. Pat. No. 7,118,367, on Oct 10, 2006, the entire contents of *each of* which [is] *are* hereby incorporated by reference.

[The invention relates to a rotor for a tablet press according to the preamble of claim 1.]

The rotor of a rotary tablet press typically comprises an upper-ram receptacle, a lower-ram guide, and a retainer plate. In axially parallel bores, the lower-ram guide receives individual lower rams which are oriented towards die-bores of the retainer plate. In axially parallel bores, the upper-ram receptacle receives upper rams which are also oriented towards die-bores. While the rotor is rotating the upper and lower rams interact with appropriate guides or pressure rollers for a compact to be manufactured and ejected. The upper-ram receptacle mostly is a separate component whereas the lower-ram guide and retainer plate are usually defined by an integral body.

The conventional design has been employed hitherto for predominantly all tabletting machines. It is also advantageous inasmuch as dies and the reception bores are "standardized" in the retainer plate for the dies. In the terminology as is used herein, dies are the molding tools which are received, mostly in a sleeve-like manner, in reception bores of the retainer plate The inside contour of the dies governs the contour of the compact. It is for the above reason that dies, irrespective of the number of stations, the machine manufacturer, the diameter of the graduated circle, etc. may be employed in any tablet press that meets conventional standards. In addition, dies involve relative low expenditure in manufacture.

This fact is opposed by significant disadvantages. The manufacture of a retainer plate involves great expenditure because the die reception bores require to be made to be precise in diameter, depth, and position accuracy. Despite this, dies cannot always be prevented from projecting above the upper side of the retainer plate or are in a lower position. This results in problems in tabletting or even cleaning. Expenditure is large anyway in cleaning the die reception bores and the blind-hole threaded bores for the die bolts. As is known dies require to be located in the reception bores by means of threaded bolts radially screwed into the die disc. In addition, mounting and dismounting the dies requires a relatively large effort. Finally, it is great expenditure and difficult to align the dies with the upper rams.

It is the object of the invention to provide a rotor for a tablet press the aim of which is to considerably reduce the effort in operating the press.

The object is achieved by the features of claim 1.

According to the invention, the retainer plate is composed of at least two ring segments which are adapted to be mounted non-positively and/or positively to the body of the lower-ram guide. Depending on the design type, the die ring segments may also be attached axially to the upper-ram receptacle, radially to the lower-ram guide or axially and radially to the upper-ram receptacle. It is also possible to manufacture the lower-ram guide and upper-ram receptacle as an integral part.

The inventive configuration of the rotor has several advantages. The ring segments may be readily dismounted from the rotor with no need to take out the rotor as a whole. Therefore, cleaning proves to be very easy. It is further simplified by the fact that specific dies are no longer necessary, but molding dies are rather defined directly by the bores in the ring segments. Therefore, the bores for the locking screws of the dies cannot happen to get contaminated.

Another advantage of rapid disassembly and assembly also is that an easy change may be made from the contour of a compact to the next contour. Also here, it is unnecessary to mount and dismount dies because dies need no longer be used for the inventive rotor. What adds to this is the further advantage that more bores may be arranged on a graduated circle than if dies are used. If dies are used the number of dies is restricted by the wall thickness of the dies and the radial blind-hole threaded bores for locating the dies by means of screws.

Since dies are no longer used there are no dies either that project above or below and could interfere with the operation of the press and make cleaning difficult.

The material for the retainer plate, which is still hard chromium-plated in most cases for reasons of wear, has been sure hitherto (e.g. GGG-40, VA cast iron, steel, etc.). Dies may be made, and are made, from different materials (hardened steel, cemented carbide, ceramics, etc.) so that the surface which contacts the product (the upper side of the retainer plate) is composed of differently wear-resistant materials. This is avoided in the die ring segments. The whole surface which contacts the product is always made of one material here.

The die ring segments preferably tighten their upper side axially against a ring surface which matches the level of the actual retainer plate. It is at this level that the dies are filled, the resultant tablets are expelled and led out of the machine via a stripper. This ensures that if the die ring segments are changed the settings of the filling device and tablet stripper need not be changed. This also makes it possible to refinish the upper side of the die ring segments, e.g. in case of wear without changing the level of the die ring segment upper side with respect to the filling device, tablet stripper, etc.

The above description proceeds assumes that at least two ring segments are used. However, a separate single-piece ring is also imaginable which may be fixed to the body of the lower-ram guide by means of appropriate fastening devices mounted thereon. A complete ring naturally requires that the body of the lower-ram guide be somewhat more complicated than is a split ring.

According to an aspect of the invention, the upper and lower sides of the ring segments are plane-parallel. The manufacture of such ring segments proves to be comparatively easy. According to another aspect of the invention, the body of the lower-ram guide has a cylindrical circumferential surface and a planar radial surface with the fixing device having locking means by which to tighten the ring segments against the circumferential and radial surfaces. Preferably, the radial surface faces the bottom so that pressing the ring segments against the radial surface will locate the level of the upper side of the ring segments and retainer plate.

The fixing device may have locking screws which are disposed to be axially parallel and act against the lower side of the ring segments to press them against the radial surface. Alternatively, provision may be made for the use of locking wedges which bear against a slanting area of the ring segments and a slanting area of the body of the lower-ram guide by means of radially disposed locking screws, thus being capable of firmly bracing the ring segments to the body.

The invention will be described in more detail below with reference to the drawings.

Figure 1:
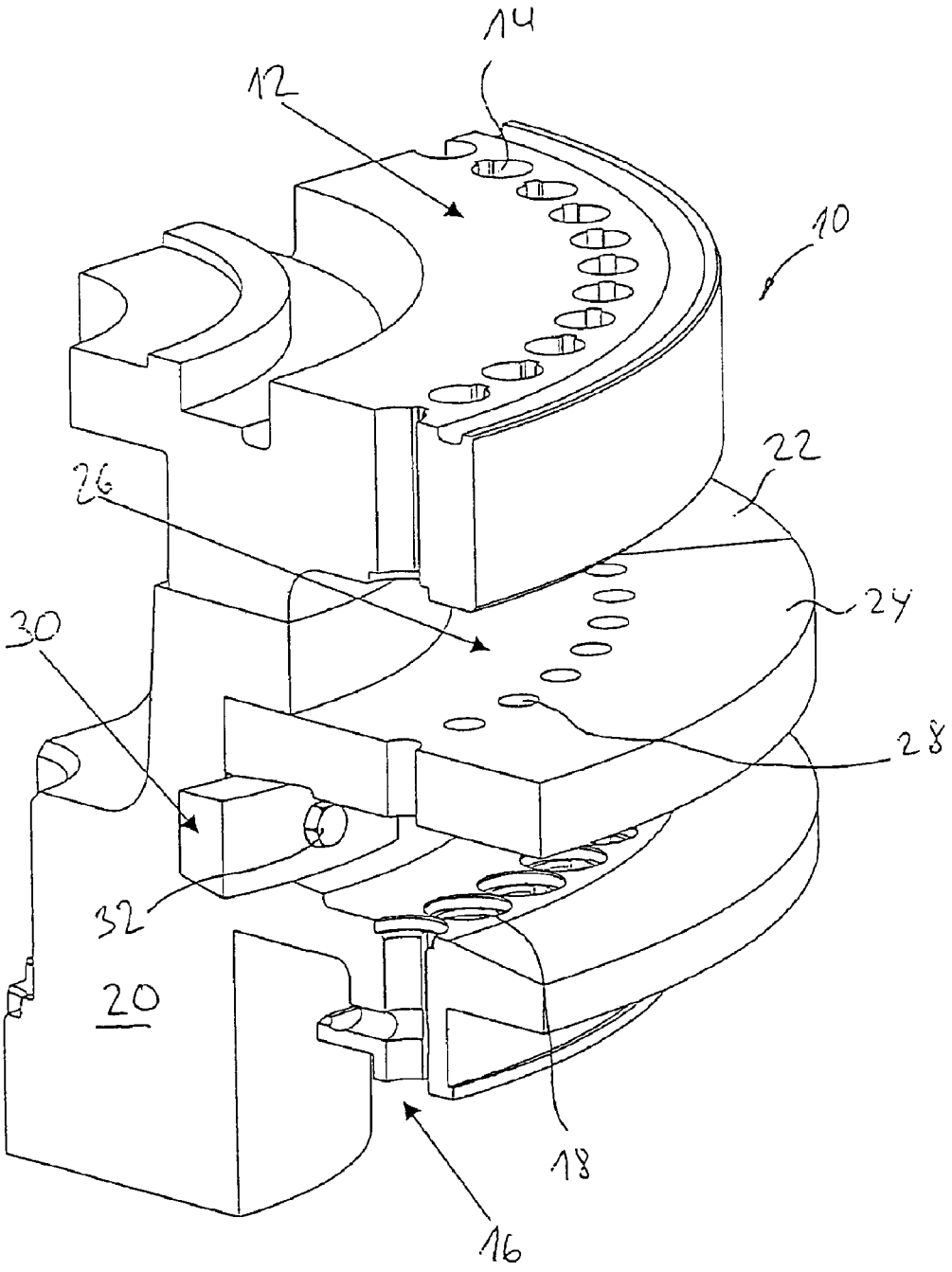
FIG. 1 shows the inventive portion of the rotor in a perspective view.

FIG. 1 allows to recognize a portion of a rotor 10 of a tablet press or tabletting machine. It has an upper-ram receptacle 12 including reception bores 14 for upper rams which are not shown. It further has a lower-ram guide 16 including reception bores 18 for lower rams which are not shown. The lower-ram guide 16 forms part of a body 20. The body 20 and upper-ram receptacle 12 are separate components and are braced against each other via radial surfaces which, however, is not illustrated in detail and is known as such.

Furthermore, FIG. 1 shows two ring segments 22, 24 which define a retainer plate 26, along with more ring segments. The ring segments 22, 24 have bores 28 disposed on a graduated circle which are interacted with by the upper and lower rams, which are not shown, for the manufacture of tablets or compacts. Thus, the contour of the compacts is determined by the contour of the bores 28.

Finally, FIG. 1 allows to recognize a locking wedge 30 to fix the ring segment 24 to the body 20 by means of a locking screw 32. The way the ring segments are fixed is more evident from FIGS. 2 and 3.

Figure 3:
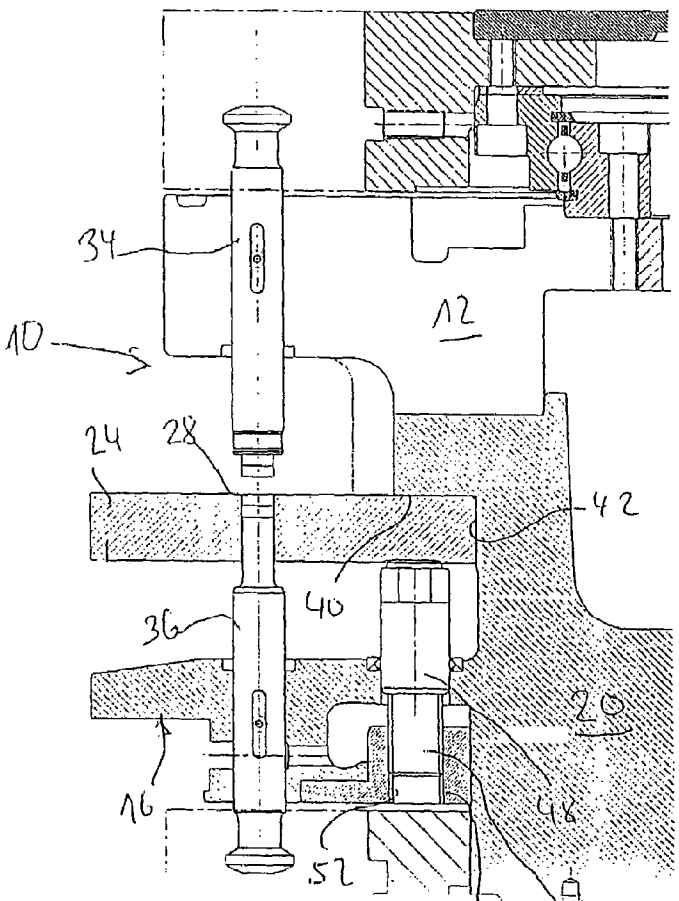
FIG. 3 shows an alternative option to fix ring segments.
Figure 2:
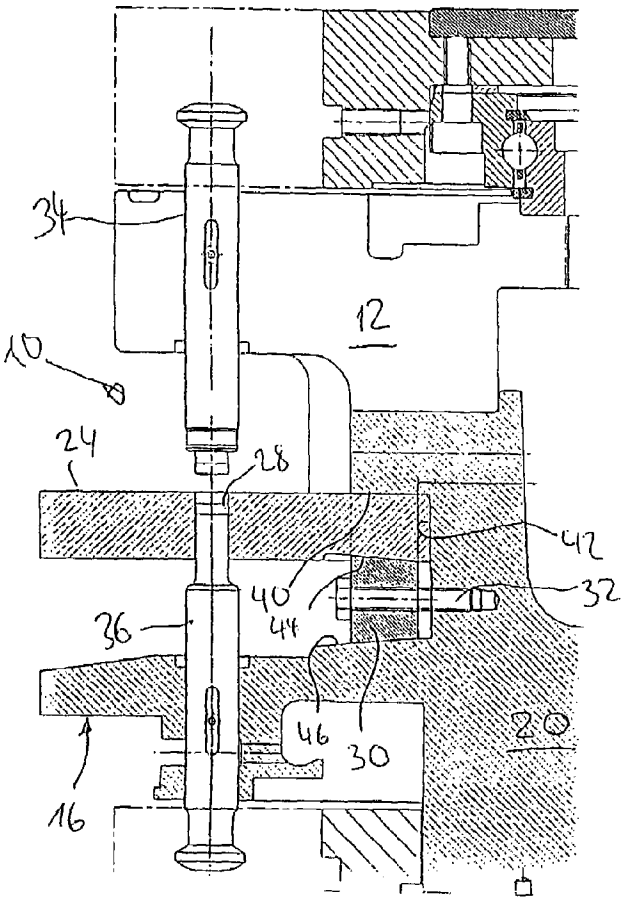
FIG. 2 shows a radial section through the representation of FIG. 1.

Since the general structure is equal in FIGS. 2 and 3 identical parts are denoted by the same reference numbers as in FIG. 1.

Furthermore, FIGS. 2 and 3 illustrate one upper ram 34 and one lower ram 36 each. The structure and function of the rams 34, 36 will not be discussed because this is generally included in the state of the art. Nor is there an intention to discuss the remaining components of the tabletting machine of FIGS. 2 and 3. It should merely be noted that the rotor 10, as a whole, is rotated by an appropriate drive about a vertical axis so that the rams 34, 36 perform upward and downward motions to produce a compact in the bores 28.

As can be seen in FIGS. 2 and 3 that the body 20 has a radial surface 40 which faces downwards and a cylindrical circumferential surface 42 which is disposed at right angles thereto. The surfaces 40, 42 serve for precisely locating the ring segments 22, 24. To mount the ring segments, there is a wedge shown in FIG. 2 which interacts with a downwardly facing slanting area 44 of the ring segments and an upwardly facing slanting area 46 of the body 20 by being radially pressed inwardly by means of the radial locking screw 32. In this way, the ring segments are firmly tightened against the surfaces 40, 42 and, thus, are given their precise positions.

In the embodiment of FIG. 3, the body 20 has provided therein bolts 48 at uniform circumferential spacings that abut against the lower side of the ring segments and are seated by threaded portions 50 in threaded bores 52 of a ring 54 firmly joined to the body 20. The bolt which is shown also allows to firmly brace the ring segments against the surfaces 40, 42.

The invention claimed is:

1. A rotor comprising:

a body, which includes a lower ram guide, the lower ram guide having a plurality of reception bores;

an upper ram receptacle, the upper ram receptacle having a plurality of reception bores;

a retainer plate, the retainer plate being comprised of at least two ring segments, [whrein] *wherein* each ring segment of the retainer plate is releasably pressed against the rotor by a locking wedge;

the retainer having a plurality of bores which are aligned with the plurality of reception bores of the upper arm receptacle and the lower ram [gide] *guide*.

2. The rotor of claim 1, wherein the bores of the retainer plate have a contour.

3. The rotor of claim 1, wherein each bore of the retainer plate has a predetermined contour.

4. The rotor of claim 1, wherein each ring segment is releasably pressed against the body of the rotor.

5. The rotor of claim 1, wherein each ring segment is releasably pressed against the upper ram receptacle of the rotor.

6. The rotor of claim 1, wherein each ring segment is releasably pressed against the body and the upper ram receptacle of the rotor.

7. The rotor of claim 1, wherein each ring segment is releasably pressed against the lower ram guide.

8. The rotor of claim 1, wherein the body, lower ram guide and upper ram receptacle are integrally formed.

9. The rotor of claim 1, wherein the retainer plate is made of only two ring segments.

10. The rotor of claim 1, wherein the retainer plate is made of more than two ring segments.

11. A rotor comprising:

a body, which includes a lower ram guide, the lower ram guide having a plurality of reception bores;

an upper ram receptacle, the upper ram receptacle having a plurality of reception bores;

a retainer plate, the retainer plate being comprised of at least two ring segments, wherein each ring segment of the retainer plate is releasably pressed against the rotor by a bolt that abuts against a lower side of the ring segment, *the bolt releasably pressing the ring segment against an underside of the body*;

the retainer plate having a plurality of bores which are aligned with the plurality of reception bores of the upper ram receptacle and the lower ram guide.

12. The rotor of claim 11, wherein the bores of the retainer plate have a contour.

13. The rotor of claim 11, wherein each bore of the retainer plate has a predetermined contour.

14. The rotor of claim 11, wherein each ring segment is releasably pressed against the body of the rotor.

15. The rotor of claim 11, wherein each ring segment is releasably pressed against the upper ram receptacle of the rotor.

16. The rotor of claim 11, wherein each ring segment is releasably pressed against the body and the upper ram receptacle of the rotor.

17. The rotor of claim 11, wherein each ring segment is releasably pressed against the lower ram guide.

18. The rotor of claim 11, the bolt having a threaded portion, the bolt being seated in a threaded bore by the threaded portion, the threaded bore being defined by a ring, the ring being joined to the rotor.

19. The rotor of claim 11, wherein the body, lower ram guide and upper ram receptacle are integrally formed.

20. The rotor of claim 11, wherein the retainer plate is made of only two ring segments.

21. A rotor comprising:

a body, which includes a lower ram guide, the lower ram guide having a plurality of reception bores;

an upper ram receptacle, the upper ram receptacle having a plurality of reception bores;

a retainer plate, the retainer plate being comprised of at least two ring segments, wherein each ring segment of the retainer plate is releasably pressed against the rotor *by a locking wedge*;

the retainer plate having a plurality of bores which are aligned with the plurality of reception bores of the upper ram receptacle and the lower ram guide.

*22. A retainer plate for a tablet press, comprising:*

*at least two ring segments, each of which is releasably pressable against a rotor of the tablet press by a locking wedge; and*

*a plurality of bores which are alignable with a plurality of reception bores of an upper ram receptacle of the rotor and a lower ram guide of the rotor.*

*23. The retainer plate of claim 22, wherein each of the ring segments is releasably pressable against the rotor by a bolt that abuts against a lower side of the ring segment.*

*24. The retainer plate of claim 22, wherein contours of the bores define a tablet shape for the tablet press.*

*25. The retainer plate of claim 22, wherein each of the ring segments is releasably pressable against the upper ram receptacle of the rotor.*

*26. The retainer plate of claim 22, wherein each of the ring segments is releasably pressable against the lower ram guide of the rotor.*

*27. The retainer plate of claim 22, wherein an inner surface of each of the ring segments has an arcuate shape.*

*28. The retainer plate of claim 28, wherein an outer surface of each of the ring segments has an arcuate shape.*

*29. The retainer plate of claim 22, wherein each of the bores is shaped to form a tablet.*

*30. The retainer plate of claim 22, wherein upper and lower sides of each of the ring segments are plane-parallel.*

*31. The retainer plate of claim 22, wherein the retainer plate is hard chromium-plated.*

*32. The retainer plate of claim 22, wherein each of the ring segments is releasably pressable against circumferential and radial surfaces of the rotor.*

*33. A ring segment for a tablet press, comprising:*

*a plurality of bores which are alignable with a plurality of reception bores of an upper ram receptacle of a rotor of the tablet press and a lower ram guide of the rotor;*

*wherein the ring segment is releasably pressable against the rotor by a locking wedge.*

*34. The ring segment of claim 33, wherein the ring segment is releasably pressable against the rotor by a bolt that abuts against a lower side of the ring segment.*

*35. The ring segment of claim 33, wherein contours of the bores define a tablet shape for the tablet press.*

*36. The ring segment of claim 33, wherein each of the ring segments is releasably pressable against the upper ram receptacle of the rotor.*

*37. The ring segment of claim 33, wherein each of the ring segments is releasably pressable against the lower ram guide of the rotor.*

*38. The ring segment of claim 33, wherein an inner surface of each of the ring segments has an arcuate shape.*

*39. The ring segment of claim 38, wherein an outer surface of each of the ring segments has an arcuate shape.*

*40. The ring segment of claim 33, wherein each of the bores is shaped to form a tablet.*

*41. The ring segment of claim 33, wherein upper and lower sides of each of the ring segments are plane-parallel.*

*42. The ring segment of claim 33, wherein the retainer plate is hard chromium-plated.*

*43. The ring segment of claim 33, wherein each of the ring segments is releasably pressable against circumferential and radial surfaces of the rotor.*

*44. A replacement part for a rotor of a tablet press, the rotor having a body that includes a lower ram guide having a plurality of reception bores and an upper ram receptacle having a plurality of reception bores, the replacement part comprising:*

*at least one ring segment body, including*

*upper and lower surfaces that are plane-parallel,*

*an inner edge surface that is arcuate-shaped and adapted to be releasably pressable against an outer surface of the rotor by a locking wedge,*

*an outer edge surface facing away from the rotor, and*

*a plurality of bores arranged in an arcuate shape between the inner and outer edge surfaces of the ring segment body.*

*45. The replacement part of claim 44, wherein the ring segment body further includes first and second end surfaces that extend radially between the inner and outer edge surfaces of the ring segment body and extend vertically between the upper and lower surfaces of the ring segment body.*

*46. The replacement part of claim 44, wherein the replacement part includes at least two ring segment bodies.*

*47. The replacement part of claim 46, wherein each of the ring segment bodies includes first and second end surfaces that extend radially between the inner and outer edge surfaces of the ring segment body and extend vertically between the upper and lower surfaces of the ring segment body.*

*48. The replacement part of claim 47, wherein the first end surface of a first one of the ring segment bodies is adjacent to, and in contact with, the second end surface of a second one of the ring segment bodies.*

*49. The replacement part of claim 44, wherein each of the bores is shaped to form a tablet.*

*50. The replacement part of claim 46, wherein each of the bores is shaped to form a tablet.*

*51. The replacement part of claim 44, wherein the bores of the ring segment body are configured to align with the reception bores of the lower ram guide and the reception bores of the upper ram receptacle.*

*52. The replacement part of claim 46, wherein the bores of the ring segment bodies are configured to align with the reception bores of the lower ram guide and the reception bores of the upper ram receptacle.*

*53. The replacement part of claim 44, wherein the ring segment body is hard chromium-plated.*

*54. The replacement part of claim 46, wherein the ring segment bodies are hard chromium-plated.*

*55. The replacement part of claim 44, wherein the outer edge surface of the ring segment body has an arcuate shape.*

*56. The replacement part of claim 46, wherein the outer edge surface of each of the ring segment bodies has an arcuate shape.*

*57. The replacement part of claim 44, wherein the ring segment body is releasably pressable against circumferential and radial surfaces of the rotor.*

*58. The replacement part of claim 44, wherein each of the ring segment bodies is releasably pressable against circumferential and radial surfaces of the rotor.*

*59. A retainer plate for use with a tablet press of the type having a rotor with an upper ram receptacle and a lower ram guide, the upper ram receptacle having a plurality of reception bores, wherein the improvement comprises:*

*the retainer plate is comprised of at least two ring segment, each ring segment having a plurality of bores which are alignable with the plurality of reception bores of the upper ram receptacle, and*

*wherein each ring segment is releasably pressable against the rotor by a locking wedge.*

* * * * *